United States Patent [19]

Mahalingaiah et al.

[11] Patent Number: 5,742,791
[45] Date of Patent: Apr. 21, 1998

[54] APPARATUS FOR DETECTING UPDATES TO INSTRUCTIONS WHICH ARE WITHIN AN INSTRUCTION PROCESSING PIPELINE OF A MICROPROCESSOR

[75] Inventors: Rupaka Mahalingaiah; Gerald D. Zuraski, Jr., both of Austin, Tex.

[73] Assignee: Advanced Micro Devices, Inc., Sunnyvale, Calif.

[21] Appl. No.: 601,618

[22] Filed: Feb. 14, 1996

[51] Int. Cl.$^6$ .................... G06F 12/08; G06F 9/38
[52] U.S. Cl. .................. 395/473; 395/381; 395/467; 395/403
[58] Field of Search ..................... 395/473, 467, 395/496, 381, 395, 569, 403, 468

[56] References Cited

U.S. PATENT DOCUMENTS

| 4,044,338 | 8/1977 | Wolf | 365/49 |
|---|---|---|---|
| 4,453,212 | 6/1984 | Gaither et al. | 395/402 |
| 4,807,115 | 2/1989 | Torng | 395/391 |
| 4,858,105 | 8/1989 | Kuriyama et al. | 395/582 |
| 5,226,126 | 7/1993 | McFarland et al. | 395/394 |
| 5,226,130 | 7/1993 | Favor et al. | 395/585 |

FOREIGN PATENT DOCUMENTS

| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Michael Slater, "AMD's K5 Designed to Outrun Pentium," Microprocessor Reort, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

*Primary Examiner*—Matthew M. Kim
*Attorney, Agent, or Firm*—Conley, Rose & Tayon; B. Noel Kivlin

[57] ABSTRACT

A core snoop buffer apparatus is provide which stores addresses of pages from which instructions have been fetched but not yet retired (i.e. the instructions are outstanding within the instruction processing pipeline). Addresses corresponding to memory locations being modified are compared to the addresses stored in the core snoop buffer on a page basis. If a match is detected, then instructions are flushed from the instruction processing pipeline and refetched. In this manner, the instructions executed to the point of modifying registers or memory are correct in self-modifying code or multiprocessor environments. Instructions may be speculatively fetched and executed while retaining coherency with respect to changes to memory. The number of pages from which instructions are concurrently outstanding within the microprocessor are typically small compared to the number of cache lines outstanding or the number of instructions outstanding. Therefore, a relatively small hardware structure may be employed to perform the instruction coherency functionality.

12 Claims, 4 Drawing Sheets

APPARATUS FOR DETECTING UPDATES TO INSTRUCTIONS WHICH ARE WITHIN AN INSTRUCTION PROCESSING PIPELINE OF A MICROPROCESSOR

BACKGROUND OF THE INVENTION

1. Field of the Invention

This invention is related to the field of microprocessors and, more particularly, to an apparatus for maintaining instruction cache coherency.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively.

In order to further increase performance, superscalar microprocessors typically include one or more caches for storing instructions and data. A cache is a storage device configured onto the same semiconductor substrate as the microprocessor, or coupled nearby. The cache may be accessed more quickly than a main memory system coupled to the microprocessor. Generally speaking, a cache stores data and instructions from the main memory system in blocks referred to as cache lines. A cache line comprises a plurality of contiguous bytes. The contiguous bytes are typically aligned in main memory such that the first of the contiguous bytes resides at an address having a certain number of low order bits set to zero. The certain number of low order bits is sufficient to uniquely identify each byte within the cache line. The remaining bits of the address form a tag which may be used to refer to the entire cache line. As used herein, the term "address" refers to a value indicative of the storage location within main memory corresponding to one or more bytes of information.

Microprocessors may be configured with a single cache which stores both instructions and data, but are more typically configured with separate instruction and data caches. The caches are typically designed to be coherent with respect main memory. In particular, coherency requires that when bytes stored in main memory are modified, the modified bytes are conveyed in response to subsequent accesses to those bytes. The modified bytes are conveyed in response to subsequent accesses even if the bytes were stored into the cache prior to the modifications. Modifications may be performed by the microprocessor, or may be performed by another microprocessor or device coupled into a computer system with the microprocessor.

Modifications performed by external devices (i.e. devices outside of the microprocessor) are often detected by "snooping". Snooping refers to a process in which the microprocessor compares addresses presented to the main memory system to the tag addresses representing bytes stored in the caches. If a match occurs during snooping, the cache line is updated according to the nature of the main memory access. For example, the cache line may be invalidated in the cache upon detection of a modification of bytes within the cache line. A subsequent access to the cache line causes the modified bytes to be fetched from the main memory system. It is noted that the snooping address comparison is typically performed on a cache line basis (i.e. only that portion of the addresses which uniquely identify the cache line affected by the main memory access are compared).

Coherency is somewhat less complicated for instruction caches than for data caches. Instruction caches are typically not modified with respect to main memory by the microprocessor. Therefore, coherency may be maintained by detecting updates through snooping and invalidating the corresponding cache lines. Additionally, modifications performed by the microprocessor to main memory locations stored in the instruction cache are detected and the corresponding instruction cache lines discarded. These microprocessor-performed modifications are detected to allow the correct execution of "self-modifying code", in which a portion of a computer program updates another portion of that computer program during execution.

The instructions comprising a particular program sequence are fetched from the cache into an instruction processing pipeline within the microprocessor. An instruction processing pipeline generally comprises one or more pipeline stages in which a portion of instruction processing is performed. Typically, instruction processing involves at least the following processing functions: decoding an instruction to determine the required operations, fetching operands for the instruction (either from memory or from registers included within the microprocessor), executing the instruction, and storing the result of the execution into a destination specified by the instruction. An instruction flows through at least the pipeline stages which perform instruction processing functions required by that instruction. Certain pipeline stages may be bypassed by a particular instruction if the processing performed by the bypassed stages is not required by the particular instruction. For example, pipeline stages which perform cache and memory accesses may be bypassed by instructions which do not access memory. When an instruction reaches the end of the instruction processing pipeline, the microprocessor has completed the actions defined for that instruction.

In a superscalar microprocessor, portions of the instruction processing pipeline comprise multiple parallel pipeline stages. The parallel stages allow multiple instructions to be concurrently processed within a particular pipeline stage. Typically, as many as 20–40 or more instructions may be within the instruction processing pipeline of a superscalar microprocessor during a particular clock cycle. Unfortunately, this vast number of instructions presents a problem for cache coherency (either for external accesses or for updates performed by store instructions executed by the microprocessor). If memory locations corresponding to instructions within the instruction processing pipeline are modified, these instructions should be discarded from the instruction processing pipeline and the modified instructions fetched. In particular, instructions may be fetched from a particular cache line and that cache line may be discarded by the instruction cache prior to the instructions being executed. Searching the instruction cache for an address being updated is not sufficient for detecting such instructions within the instruction processing pipeline. Including logic for coherency checking at each pipeline stage would be prohibitive in both occupied silicon area and complexity. A mechanism for detecting updates to instructions within the instruction processing pipeline and for responding appropriately is desired.

SUMMARY OF THE INVENTION

The problems outlined above are in large part solved by a microprocessor employing a core snoop buffer apparatus in accordance with the present invention. The core snoop buffer stores addresses of pages from which instructions have been fetched but not yet retired (i.e. the instructions are outstanding within the instruction processing pipeline). Addresses corresponding to memory locations being modified are compared to the addresses stored in the core snoop buffer on a page basis. If a match is detected, then instructions are flushed from the instruction processing pipeline and refetched. In this manner, the instructions executed to the point of modifying registers or memory are correct in self-modifying code or multiprocessor environments. Advantageously, instructions may be speculatively fetched and executed, and yet still are coherent with respect to changes to memory. Additionally, the number of pages from which instructions are concurrently outstanding within the microprocessor are typically small compared to the number of cache lines outstanding or the number of instructions outstanding. Therefore, a relatively small hardware structure may be employed to perform the instruction coherency functionality.

Several embodiments of the core snoop buffer are shown. In one embodiment, addresses of pages along with a count of the outstanding instructions from each page are stored. Such an embodiment efficiently uses the storage locations by storing each page address in at most one storage location. The corresponding counts are incremented as additional instructions enter the instruction processing pipeline and decremented as instructions exit the instruction processing pipeline. In another embodiment, a FIFO buffer is employed which stores the pages of addresses in the order that instructions from the pages are fetched. A particular page address may be stored in more than one buffer location. However, deleting entries from the buffer comprises detecting an instruction which is retired from a different page than a previously retired instruction. The least recently added entry in the FIFO is removed upon such detection. These embodiments as well as other embodiments serve different desired levels of complexity and performance.

Broadly speaking, the present invention contemplates an apparatus for snooping updates to instructions which are within an instruction processing pipeline of a microprocessor. The apparatus comprises a first bus, an instruction storage, a buffer, a plurality of comparators, and a control unit. The first bus is configured to convey a first address indicative of a first memory location which is being updated. Included for storing a plurality of instructions, the instruction storage is divided into a plurality of cache lines into which the plurality of instructions are stored. A cache line comprises a particular number of consecutive instruction bytes. The buffer is configured to store a plurality of addresses, wherein each one of the plurality of addresses identifies at least two consecutive cache lines of instructions. The plurality of addresses encompasses memory locations corresponding to a second plurality of instructions which are within the instruction processing pipeline. Coupled to the first bus and the buffer, each one of the plurality of comparators receives one of the plurality of addresses. The comparators are configured to compare a subset of the first address to the plurality of addresses, and to assert signals indicating that the comparison indicates equality. The control unit is coupled to the buffer and to the plurality of comparators, and is configured to store each one of the plurality of addresses into the buffer when at least one instruction encompassed by one of the plurality of addresses is dispatched into the instruction processing pipeline.

The present invention further contemplates a method for snooping updates to instructions which are within an instruction processing pipeline of a microprocessor, comprising several steps. An address indicative of a plurality of instructions is stored in a buffer. The address is stored when the plurality of instructions enter the instruction processing pipeline. An update address indicative of a memory location being updated is compared to the address stored in the buffer. The plurality of instructions are flushed from the instruction processing pipeline if the compare indicates that the update address corresponds to the address. The address is discarded from the buffer when the plurality of instructions exit the instruction processing pipeline.

BRIEF DESCRIPTION OF THE DRAWINGS

Other objects and advantages of the invention will become apparent upon reading the following detailed description and upon reference to the accompanying drawings in which.

Figure 1:
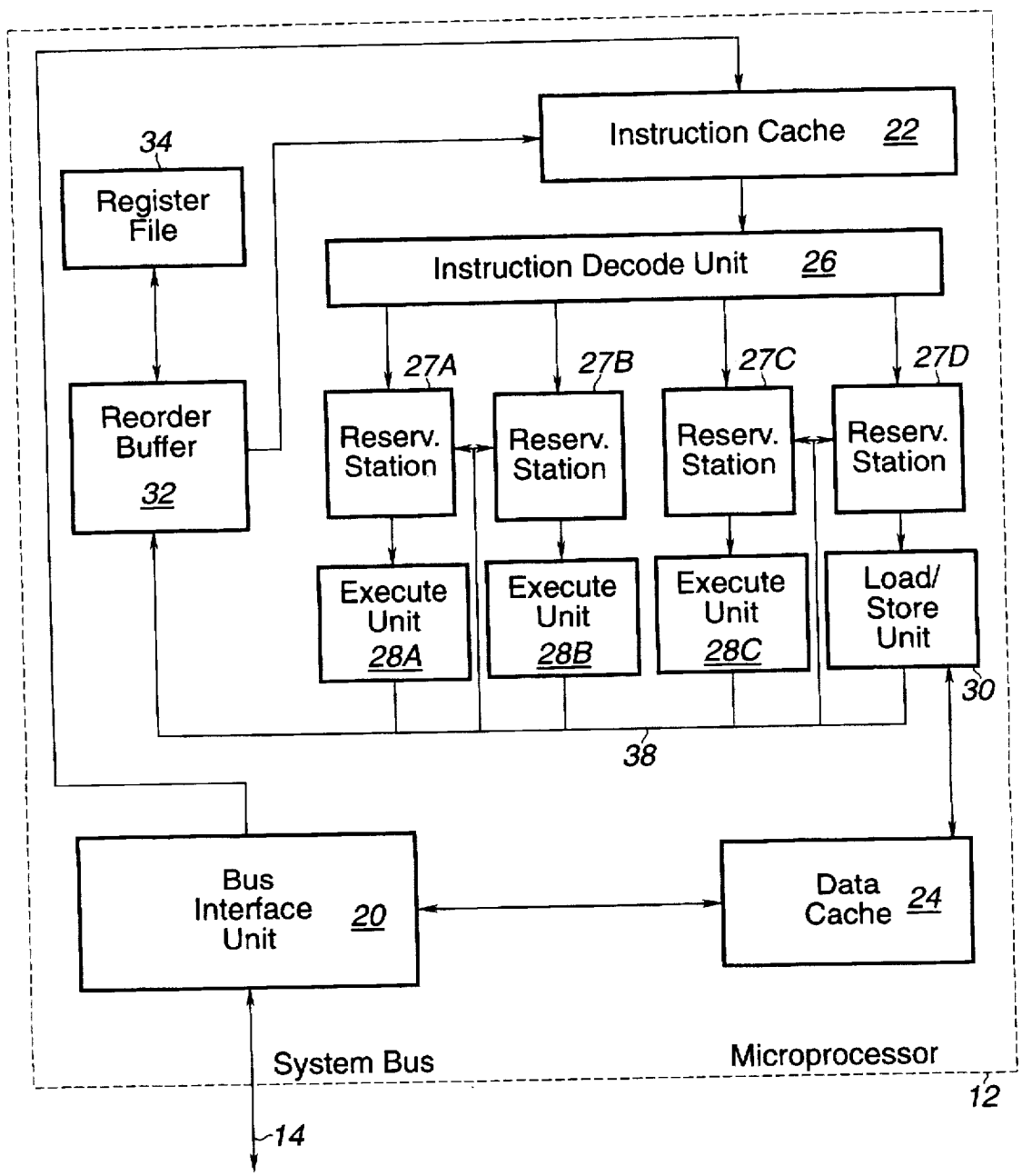
FIG. 1 is a block diagram of a superscalar microprocessor, including an instruction cache.

While the invention is susceptible to various modifications and alternative forms, specific embodiments thereof are shown by way of example in the drawings and will herein be described in detail. It should be Understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a superscalar microprocessor 12 is shown. Microprocessor 12 includes a bus interface unit 20, an instruction cache 22, a data cache 24, an instruction decode unit 26, a plurality of reservation stations 27A–27D, a plurality of execute units 28A–28C, a load/store unit 30, a reorder buffer 32, and a register file 34. The plurality of execute units will be collectively referred to herein as execute units 28, and the plurality of reservation stations will be collectively referred to as reservation stations 27. Bus interface unit 20 is coupled to instruction cache 22, data cache 24, and a system bus 14. Instruction cache 22 is further coupled to instruction decode unit 26, which is in turn coupled to reservation stations 27, reorder buffer 32, and register file 34. Reservation stations 27A–27C are coupled to respective execute units 28A–28C, and reservation station 27D is coupled to load/store unit 30. Reorder buffer 32, reservation stations 27, execute units 28, and load/store unit 30 are each coupled to a result bus 38 for forwarding of execution results. Load/store unit 30 is coupled to data cache 24. Finally, reorder buffer 32 is coupled to instruction cache 22.

Generally speaking, the instruction processing pipeline of microprocessor 12 includes instruction decode unit 26, reservation stations 27, execute units 28, load/store unit 30, and reorder buffer 32. Instructions may be outstanding within one or more of these portions of the instruction processing pipeline during a given clock cycle. If a store memory operation performed by load/store unit 30 or a memory operation upon system bus 14 modifies memory locations corresponding to outstanding instructions, the instructions are flushed by microprocessor 12. It is noted that flushing an instruction refers to removing the instruction from the instruction processing pipeline and discarding any results microprocessor 12 may have generated during processing of the instruction.

In one embodiment, microprocessor 12 detects a store memory operation which modifies instructions outstanding within the instruction processing pipeline and flushes all instructions which are subsequent to the store memory operation within reorder buffer 32. The subsequent instructions are refetched beginning with the instruction subsequent to the memory operation. Conversely, when a snooped memory operation from system bus 14 is detected, instructions within reorder buffer 32 are flushed and instruction fetch begins with the instruction subsequent to the most recently retired instruction. Cache lines associated with the store memory operation or the snooped memory operation are invalidated within instruction cache 22. Therefore, if the instructions which were outstanding in the pipeline prior to the instruction flush were modified, the instruction fetch will miss instruction cache 22 and the modified instructions will be fetched from the main memory system.

Microprocessor 12 detects modifications to the instructions outstanding within the instruction processing pipeline by storing addresses of pages containing the instructions in a buffer within instruction cache 22. Addresses of operations from system bus 14 and addresses of store memory operations are compared on a page basis (i.e. that portion of the addresses which identify the corresponding pages are compared) to the addresses within the buffer. A "page" refers to a block of contiguous bytes of main memory, aligned such that the high order bits of a base address identifying the first byte in the page may be concatenated with various offsets to generate the address of any byte within the page. The page includes more contiguous bytes than a cache line (i.e. a page corresponds to at least two contiguous cache lines). In one embodiment, a page comprises four contiguous kilobytes. By storing the addresses of pages associated with instructions, a relatively small number of addresses may be stored which encompass the vast number of instructions outstanding within microprocessor 12. In many code sequences, the instructions which may be outstanding within microprocessor 12 at any given time are contained within a small number of pages. Advantageously, a relatively small amount of hardware may be employed to detect modifications to memory locations associated with a vast number of instructions. Correct execution of self-modifying instruction sequences and instruction sequences which are modified by an external device is guaranteed by the buffer of page addresses and associated control logic, as will be described in more detail below. It is noted that, although page addresses are stored in the embodiments described below, addresses indicative of any plurality of contiguous cache lines may be stored within the spirit and scope of the present invention.

It is noted that, for embodiments of microprocessor 12 employing the x86 microprocessor architecture, coherency of instructions with respect to snooped accesses is not precise. In particular, if an instruction is in the instruction processing pipeline, it need not be discarded when a snoop occurs. The cache line within instruction cache 22 is discarded in such situations. However, coherency with respect to store memory accesses performed by microprocessor 12 (e.g. self modifying code) is required to be precise by the x86 microprocessor architecture. Embodiments which maintain precise coherency of instructions only with respect to store memory accesses performed by microprocessor 12 are contemplated.

Instruction cache 22 is a high speed cache memory for storing instructions. It is noted that instruction cache 22 may be configured into a set-associative or direct-mapped configuration. Instruction cache 22 may additionally include a branch prediction mechanism for predicting branch instructions as either taken or not taken. Instructions are fetched from instruction cache 22 and conveyed to instruction decode unit 26 for decode and dispatch to an execution unit.

In the embodiment shown, instruction decode unit 26 decodes each instruction fetched from instruction cache 22. Instruction decode unit 26 dispatches each instruction to a reservation station 27A-27D coupled to an execute unit 28 or load/store unit 30 which is configured to execute the instruction. Instruction decode unit 26 also detects the register operands used by the dispatched instructions and requests these operands from reorder buffer 32 and register file 34. In one embodiment, execute units 28 are symmetrical execution units. Symmetrical execution units are each configured to execute a particular subset of the instruction set employed by microprocessor 12. The subsets of the instruction set executed by each of the symmetrical execution units are the same. In another embodiment, execute units 28 are asymmetrical execution units configured to execute dissimilar instruction subsets. For example, execute units 28 may include a branch execute unit for executing branch instructions, one or more arithmetic/logic units for executing arithmetic and logical instructions, and one or more floating point units for executing floating point instructions. Instruction decode unit 26 dispatches an instruction to an execute unit 28 or load/store unit 30 which is configured to execute that instruction. As used herein, the term "dispatch" refers to conveying an instruction to an appropriate execution unit or load/store unit for execution of the instruction.

Load/store unit 30 provides an interface between execute units 28 and data cache 24. Load and store memory operations are performed by load/store unit 30 to data cache 24. Additionally, memory dependencies between load and store memory operations are detected and handled by load/store unit 30.

Reservation stations 27 are provided for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 26, execute units 28, and load/store unit 30. Such an embodiment may perform the dispatch function within the centralized reservation station.

Microprocessor 12 supports out of order execution, and employs reorder buffer 32 for storing execution results of speculatively executed instructions and storing these results into register file 34 in program order, for performing dependency checking and register renaming, and for providing for mispredicted branch and exception recovery. When an instruction is decoded by instruction decode unit 26, requests for register operands are conveyed to reorder buffer 32 and register file 34. In response to the register operand requests, one of three values is transferred to the reservation station 27 which receives the instruction: (1) the value stored in reorder buffer 32, if the value has been speculatively generated; (2) a tag identifying a location within reorder buffer 32 which will store the result, if the value has not been speculatively generated; or (3) the value stored in the register within register file 34, if no instructions within reorder buffer 32 modify the register. Additionally, a storage location within reorder buffer 32 is allocated for storing the results of the instruction being decoded by instruction decode unit 26. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 28 or load/store unit 30 execute an instruction, the tag assigned to the instruction by reorder buffer 32 is conveyed upon result bus 38 along with the result of the instruction. Reorder buffer 32 stores the result in the indicated storage location. Additionally, reservation stations 27 compare the tags conveyed upon result bus 38 with tags of operands for instructions stored therein. If a match occurs, the unit captures the result from result bus 38 and stores it with the corresponding instruction. In this manner, an instruction may receive the operands it is intended to operate upon. Capturing results from result bus 38 for use by instructions is referred to as "result forwarding".

Instruction results are stored into register file 34 by reorder buffer 32 in program order. Storing the results of an instruction and deleting the instruction from reorder buffer 32 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 32 discards the instructions subsequent to that instruction. Instructions thus discarded are also flushed from reservation stations 27, execute units 28, load/store unit 30, and instruction decode unit 26.

Details regarding suitable reorder buffer implementations may be found within the publication "Superscalar Microprocessor Design" by Mike Johnson, Prentice-Hall, Englewood Cliffs, N.J. 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Register file 34 includes storage locations for each register defined by the microprocessor architecture employed by microprocessor 12. For example, microprocessor 12 may employ the x86 microprocessor architecture. For such an embodiment, register file 34 includes locations for storing the EAX, EBX, ECX, EDX, ESI, EDI, ESP, and EBP register values.

Data cache 24 is a high speed cache memory configured to store data to be operated upon by microprocessor 12. It is noted that data cache 24 may be configured into a set-associative or direct-mapped configuration.

Bus interface unit 20 is configured to effect communication between microprocessor 12 and devices coupled to system bus 14. For example, instruction fetches which miss instruction cache 22 may be transferred from main memory by bus interface unit 20. Similarly, data requests performed by load/store unit 30 which miss data cache 24 may be transferred from main memory by bus interface unit 20. Additionally, data cache 24 may discard a cache line of data which has been modified by microprocessor 12. Bus interface unit 20 transfers the modified line to main memory.

It is noted that instruction decode unit 26 may be configured to dispatch an instruction to more than one execution unit. For example, in embodiments of microprocessor 12 which employ the x86 microprocessor architecture, certain instructions may operate upon memory operands. Executing such an instruction involves transferring the memory operand from data cache 24, executing the instruction, and transferring the result to memory (if the destination operand is a memory location). Load/store unit 30 performs the memory transfers, and an execute unit 28 performs the execution of the instruction.

Figure 2:
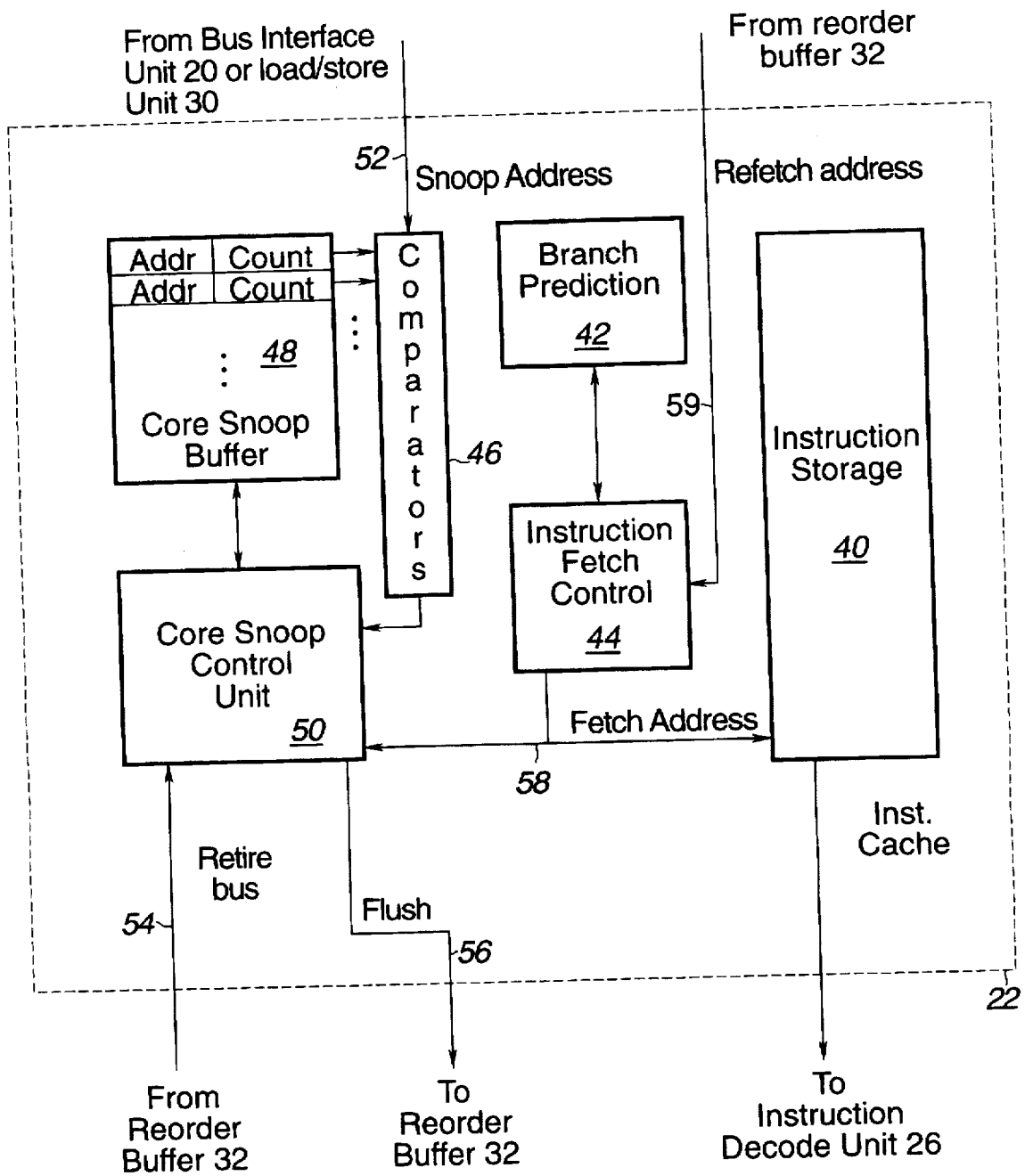
FIG. 2 is a block diagram of one embodiment of the instruction cache shown in FIG. 1.

Turning next to FIG. 2, a first embodiment of instruction cache 22 is shown. Instruction cache 22 includes an instruction storage 40, a branch prediction unit 42, an instruction fetch control unit 44, a comparator block 46, a core snoop buffer 48, and a core snoop control unit 50. A snoop address bus 52 is coupled to comparator block 46, which is further coupled to core snoop buffer 48 and core snoop control unit 50. Core snoop control unit 50 is further coupled to a retire bus 54 from reorder buffer 32, a flush conductor 56, and a fetch address bus 58. Fetch address bus 58 is coupled to instruction storage 40 and to instruction fetch control unit 44, which is further coupled to branch prediction unit 42.

Generally speaking, the mechanism shown in FIG. 2 stores addresses of pages from which instructions have been fetched by instruction fetch control unit 44, but which have yet to be retired by reorder buffer 32. Comparator block 46 receives addresses upon snoop address bus 52 from both bus interface unit 20 (for the snooped addresses from system bus 14), and from load/store unit 30 (for store memory operations performed by microprocessor 12). Comparator block 46 compares the portion of the received addresses identifying the page affected by the corresponding operation to the page addresses stored in core snoop buffer 48. If a comparator circuit within comparator block 46 indicates equality, then core snoop control unit 50 asserts a signal upon flush conductor 56. When reorder buffer 32 receives the asserted signal, instructions are flushed from the instruction processing pipeline of microprocessor 12. If the flush is due to a store memory operation performed by microprocessor 12, instructions subsequent to the store memory operation in program order are flushed. If the flush is due to a snooped operation, instructions within reorder buffer 32 are flushed. Instructions may then be refetched beginning with the instruction subsequent to the store memory operation, or the instruction subsequent to the most recently retired instruction. Advantageously, correct operation of a program is maintained for situations in which instruction code is modified. It is noted that flush conductor 56 may comprise a pair of conductors which carry a pair of signals for identifying (i) flushes due to snooped addresses and (ii) flushes due to store memory operations.

Instruction storage 40 comprises a plurality of storage locations for storing instruction bytes and tag information. Instructions are fetched from instruction storage 40 under the control of instruction fetch control unit 44, and conveyed to instruction decode unit 26 for decode and dispatch to reservation stations 27. Instruction fetch control unit 44 transmits fetch addresses upon fetch address bus 58 to instruction storage 40, as well as to core snoop control unit 50. The fetch address is additionally transmitted to branch prediction unit 42 for prediction of branch instructions which may reside within the fetched instructions. Branch prediction unit 42 may employ a buffer of target addresses and branch predictions (i.e. taken or not taken), and may use any suitable branch prediction mechanism. Branch prediction mechanisms are well known.

Instruction fetch control unit 44 generates subsequent fetch addresses based upon branch prediction information from branch prediction unit 42, the number of instructions fetched during a given cycle, and any flush information transmitted by reorder buffer 32. If branch prediction unit 42 indicates that no branch instruction exists within the fetched instructions, or that the branch instruction is not taken, then instruction fetch control unit 44 generates a subsequent fetch address based on the current fetch address and the number of instruction bytes dispatched during the current clock cycle. Conversely, if branch prediction unit 42 provides a predicted branch address, instruction fetch control unit 44 uses the predicted branch address as the subsequent fetch address. Finally, if reorder buffer 32 indicates that instruction are being flushed, then instruction fetch control unit 44 fetches instructions based on an address provided by reorder buffer 32 upon refetch address bus 59. Reorder buffer 32 may provide the address in cases where a branch instruction was mispredicted, executing an instruction causes an exception, or core snoop control unit 50 asserts a signal upon flush conductor 56.

Core snoop control unit 50 receives fetch addresses from fetch address bus 58. The fetch address is compared, on a page basis, with addresses stored within core snoop buffer 48. Each address stored in core snoop buffer 48 has an associated count value, as shown in FIG. 2. If a fetch address lies within a page represented in core snoop buffer 48, then the corresponding count value is increased by the number of instructions fetched from instruction storage 40 during the current clock cycle. If a fetch address lies within a page which is not represented in core snoop buffer 48, then the page address corresponding to the fetch address is stored into core snoop buffer 48. The count value is initialized to the number of instructions fetched. Core snoop control unit 50 may receive the number of instructions associated with a particular fetch from instruction decode unit 26, in one embodiment.

When reorder buffer 32 retires one or more instructions within a given page, reorder buffer 32 transmits upon retire bus 54 the page address of the instructions along with the number of instructions being retired. Core snoop control unit 50 decreases the corresponding count value by the number of instructions retired. Similarly, when instructions are flushed from reorder buffer 32, addresses and count values are flushed from core snoop buffer 48. When a count value is reduced to zero, instructions from the corresponding page are no longer outstanding within the instruction processing pipeline of microprocessor 12. The buffer storage location storing the address and count value are thereby made available for allocation to another page address. It is noted that when core snoop buffer 48 is storing a maximum number of page addresses and a new page address needs to be stored therein, microprocessor 12 stalls instruction dispatch until a buffer location is freed via retirement of previously dispatched instructions.

Core snoop buffer 48 comprises a plurality of storage locations for storing page addresses and corresponding count values. In one embodiment, core snoop buffer 48 includes storage sufficient for four page addresses and count values. Many typical code sequences may be dispatched without stall with this number of core snoop buffer storage locations, which allow instructions from up to four different pages to be simultaneously outstanding within the instruction processing pipeline of microprocessor 12. In other words, the instruction processing pipeline typically becomes full prior to core snoop buffer 48 becoming full. Other embodiments may include more or less storage within core snoop buffer 48. Comparator block 46 includes a comparator circuit for each core snoop buffer storage location. The comparator circuits are configured to compare the upper order bits of the addresses which define the page within which the address lies. For example, if addresses are 32 bits and pages are 4 kilobytes, 20 upper order bits are compared by comparator circuits within comparator block 46.

It is noted that the mechanism described above detects updates to pages from which instructions are outstanding within the instruction processing pipeline of microprocessor 12. The outstanding instructions may in fact not be modified, since these instructions may lie within a different portion of the page than the modification is accessing. In one embodiment, a finer granularity check may be performed prior to flushing instructions from the instruction processing pipeline. For example, if core snoop control unit 50 asserts a signal upon flush conductor 56 to reorder buffer 32, reorder buffer 32 may examine the address being modified to determine if the outstanding instructions reside within the same cache line as the bytes being modified. Reorder buffer 32 may then flush instructions only if the cache lines containing the outstanding instructions have been modified.

It is further noted that instruction storage 40 is updated according to the address conveyed upon snoop address bus 52. Typically, tags corresponding to instruction bytes stored within instruction storage 40 are compared to the snoop addresses and store memory operation addresses. If a match occurs, then the cache line corresponding to the matching tag is invalidated within instruction storage 40. Subsequent accesses to the cache line will cause instruction bytes to be transferred from the main memory system. It is noted that the comparison between addresses of bytes being modified and tag addresses is performed on a cache line basis, as opposed to a page basis as in comparator block 46. Any suitable snoop and update mechanism may be used to maintain the coherency of instruction storage 40.

Figure 3:
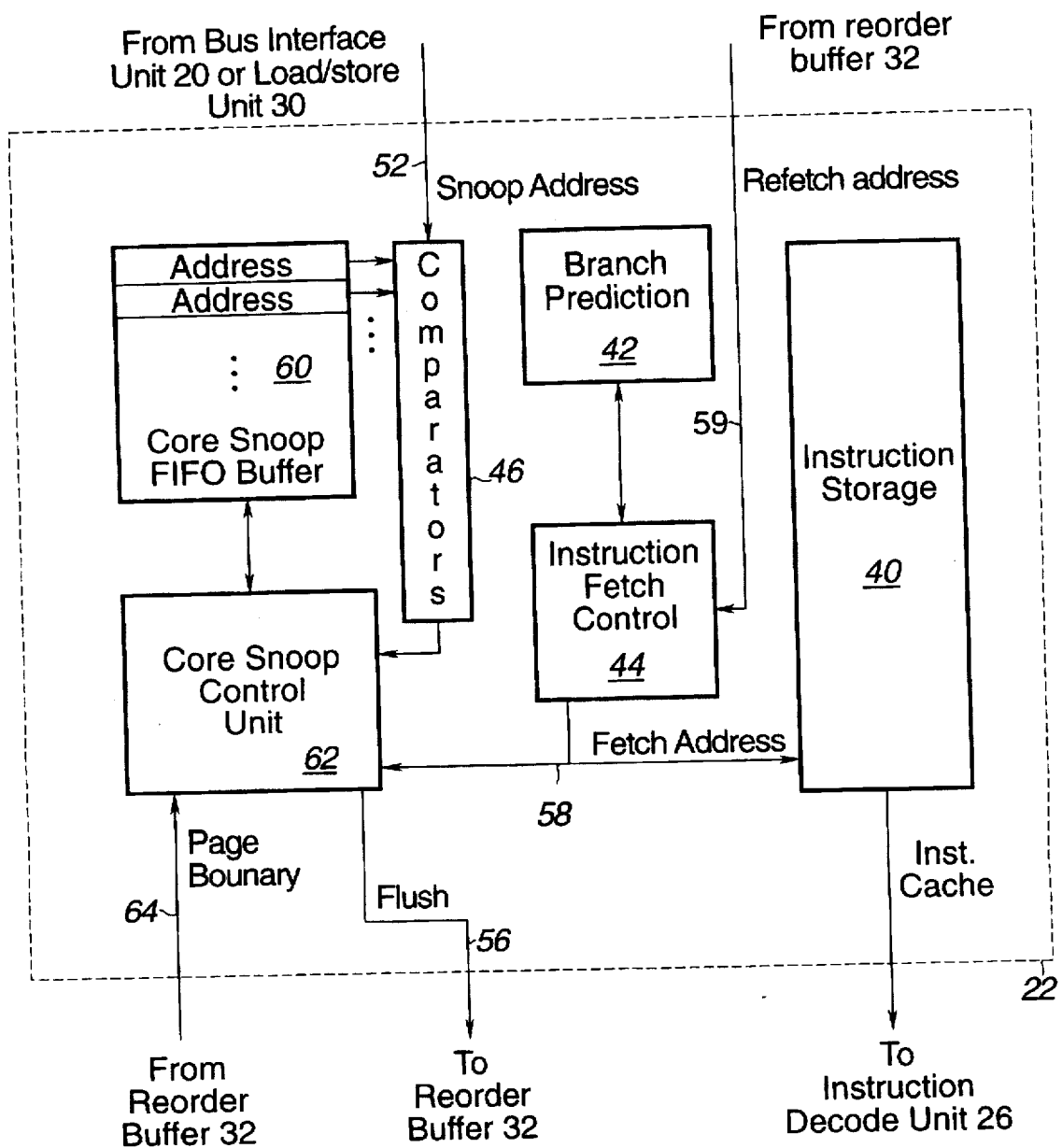
FIG. 3 is a block diagram of another embodiment of the instruction cache shown in FIG. 1.

Turning next to FIG. 3, a second embodiment of instruction cache 22 is shown. Like-numbered elements of FIGS. 2 and 3 are similar. In the second embodiment, instruction cache 22 includes instruction storage 40, branch prediction unit 42, instruction fetch control unit 44, comparator block 46, a core snoop FIFO buffer 60, and a core snoop control unit 62. Instruction storage 40, branch prediction unit 42, instruction fetch control unit 44, and comparator block 46 are coupled and operate substantially similar to the first embodiment of instruction cache 22.

Core snoop FIFO buffer 60 includes a plurality of storage locations configured to store page addresses which encompass the instructions outstanding within the instruction processing pipeline of microprocessor 12. Core snoop buffer 60 is arranged as a first-in, first-out (FIFO) buffer. A first-in, first-out storage device stores information in the order the information is received, and the information is removed from the storage device in the same order. The storage device may receive a command to store an new piece of information, which is placed at the "bottom" of the storage device. The bottom of the storage device comprises a storage location which stores the most recently added piece of information. Additionally, the storage device may receive a command to delete a piece of information. The information deleted is that stored at the "top" of the storage device. The top of the storage device comprises a storage location which stores the least recently added piece of information. Information may be shifted between storage locations within the storage device such that the top of the storage device is always the same physical location. Conversely, pointers may be used to indicate which storage locations are the top and bottom of the storage device at any given time. In one embodiment, core snoop FIFO buffer 60 comprises storage sufficient for storing up to four addresses. If core snoop FIFO buffer 60 is full (e.g. is storing four addresses) and a new page address needs to be stored, instruction dispatch is stalled until a storage location becomes available.

Core snoop control unit 62 receives the fetch address upon fetch address bus 58. The fetch address is compared, on a page basis, to the address stored at the bottom of core snoop FIFO buffer 60. If the fetch address lies within the same page as the address stored at the bottom of the buffer, then the fetch address is discarded by core snoop control unit 62. If the fetch address lies within a different page than the address stored at the bottom of the buffer, the fetch address is stored into core snoop FIFO buffer 60. The fetch address therefore becomes the bottom of core snoop FIFO buffer 60. Core snoop FIFO buffer 60 stores a list of pages from which instructions have been fetched. The pages are listed in the order in which the pages have been fetched. Each consecutive pair of addresses is indicative of a page boundary crossing (i.e. instructions being fetched are within a different page than instructions previously fetched) within the sequential order of instructions. Therefore, reorder buffer 32 informs core snoop control unit 62 when instructions are retired from a different page than instructions retired previously via an asserted signal upon page boundary conductor 64. Additionally, reorder buffer 32 may assert the signal upon page boundary conductor 64 when instructions flushed from reorder buffer 32 cross a page boundary. Core snoop control unit 62 causes the address stored at the top of core snoop FIFO buffer 60 to be removed upon receipt of an asserted signal upon page boundary conductor 64. In this manner, core snoop FIFO buffer 60 stores a set of page addresses which encompass the instructions outstanding within the instruction processing pipeline of microprocessor 12. By comparing addresses of bytes being modified to the contents of core snoop FIFO buffer 60, updates to pages containing instructions outstanding within the instruction processing pipeline may be detected.

Because core snoop FIFO buffer 60 stores a list of pages from which instructions were fetched in the order the instructions were fetched, more than one storage location within core snoop FIFO buffer 60 may store the same page address. For example, a code sequence may contain a first set of instructions fetched from a first page, a second set of instructions subsequently fetched from a second page, and a third set of instructions fetched from the first page subsequent to fetch of the second set of instructions. This exemplary instruction sequence would result in the address of the first page being stored at the top of the buffer, followed by the address of the second page, followed by the address of the first page at the bottom of the buffer. When an instruction from the second set of instructions is retired, reorder buffer 32 asserts a signal upon page boundary conductor 64 and core snoop control unit 62 removes the first page address from the top of the buffer. The top of the buffer then stores the second page address. Similarly, when an instruction is retired from the third set of instructions, reorder buffer 32 asserts a signal upon page boundary conductor 64. Core snoop control unit 62 responds by deleting the second page address from core snoop FIFO buffer 60, leaving the first page address at the top of the buffer.

Since each page address appears only once in core snoop buffer 48 as opposed to multiple occurrences in core snoop FIFO buffer 62 in cases where instructions are fetched alternately from two or more pages, core snoop buffer 48 may be more efficient than core snoop FIFO buffer 62. However, the control logic for core snoop buffer 48 is somewhat more complicated in that count values are increased and decreased. Additionally, each address stored within core snoop buffer 48 is compared to retired addresses and newly fetched addresses for determination of responses to these addresses. The choice between the two embodiments shown and other embodiments is therefore a choice between design complexity and performance.

Figure 4:
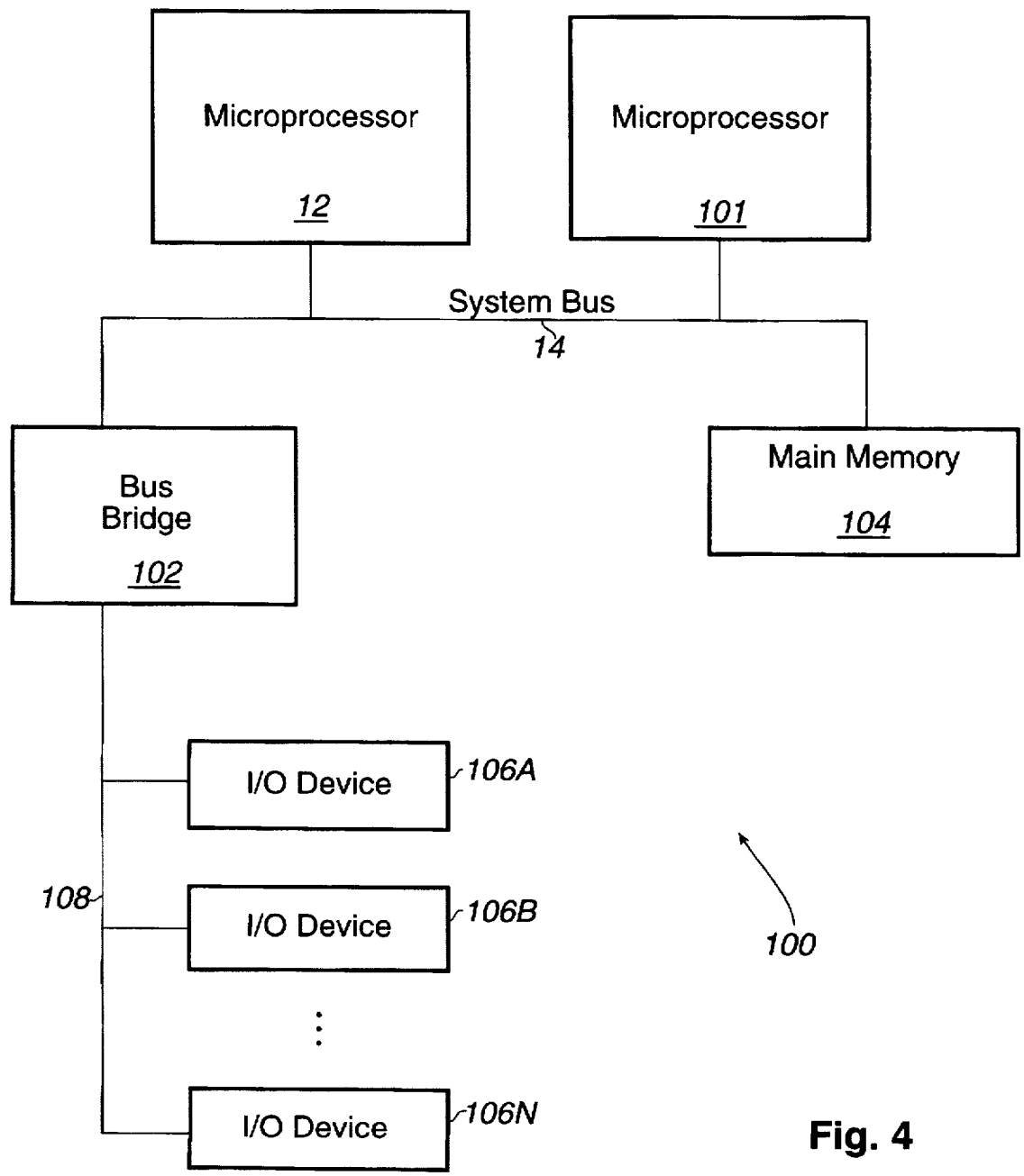
FIG. 4 is a block diagram of a computer system including the microprocessor shown in FIG. 1.

Turning now to FIG. 4, a computer system 100 including microprocessor 12 is shown. Computer system 100 further includes a second microprocessor 101, a bus bridge 102, a main memory 104, and a plurality of input/output (I/O) devices 106A–106N. Plurality of I/O devices 106A–106N will be collectively referred to as I/O devices 106. Microprocessor 12, bus bridge 102, and main memory 104 are coupled to system bus 14. I/O devices 106 are coupled to an I/O bus 108 for communication with bus bridge 102. Microprocessor 101 may be similar to microprocessor 12, or may be of different construction.

Memory locations within main memory 104 may be updated via performance of a store memory operation by microprocessor 12. Additionally, microprocessor 101 may update memory locations, or I/O devices 106 may update memory locations through bus bridge 102. Microprocessor 12 detects updates from store memory operations internally, and snoops updates from microprocessor 101 and bus bridge 102 upon system bus 14.

Bus bridge 102 is provided to assist in communications between I/O devices 106 and devices coupled to system bus 14. I/O devices 106 typically require longer bus clock cycles than microprocessor 12 and other devices coupled to system bus 14. Therefore, bus bridge 102 provides a buffer between system bus 14 and input/output bus 108. Additionally, bus bridge 102 translates transactions from one bus protocol to another. In one embodiment, input/output bus 108 is an Enhanced Industry Standard Architecture (EISA) bus and bus bridge 102 translates from the system bus protocol to the EISA bus protocol. In another embodiment, input/output bus 108 is a Peripheral Component Interconnect (PCI) bus and bus bridge 102 translates from the system bus protocol to the PCI bus protocol. It is noted that many variations of system bus protocols exist. Microprocessor 12 may employ any suitable system bus protocol.

I/O devices 106 provide an interface between computer system 100 and other devices external to the computer system. Exemplary I/O devices include a modem, a serial or parallel port, a sound card, etc. I/O devices 106 may also be referred to as peripheral devices. Main memory 104 stores data and instructions for use by microprocessor 12. In one embodiment, main memory 104 includes at least one Dynamic Random Access Memory (DRAM) and a DRAM memory controller.

It is noted that although computer system 100 as shown in FIG. 4 includes two microprocessors, other embodiments of computer system 100 may include multiple microprocessors similar to either microprocessor 12 or microprocessor 101. Similarly, computer system 100 may include multiple bus bridges 102 for translating to multiple dissimilar or similar I/O bus protocols. Still further, a cache memory for enhancing the performance of computer system 100 by storing instructions and data referenced by microprocessor 12 in a faster memory storage may be included. The cache memory may be inserted between microprocessor 12 and system bus 14, or may reside on system bus 14 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a mechanism has been described for detecting updates to instructions which are outstanding within the instruction processing pipeline of a microprocessor. Advantageously, correct operation is maintained in both self-modifying code and multiprocessor environments. The mechanism detects updates to pages from which instructions have been fetched and remain outstanding within the instruction processing pipeline. The number of values which are compared to addresses which are being updated are thereby reduced without appreciable performance penalties.

Numerous variations and modifications will become apparent to those skilled in the art once the above disclosure is fully appreciated. It is intended that the following claims be interpreted to embrace all such variations and modifications.

What is claimed is:

1. An apparatus for snooping updates to instructions which are within an instruction processing pipeline of a microprocessor, comprising:

a first bus configured to convey a first address indicative of a first memory location which is being updated;

an instruction storage for storing a plurality of instructions, wherein said instruction storage is divided into a plurality of cache lines into which said plurality of instructions are stored, and wherein a cache line comprises a particular number of consecutive instruction bytes;

a buffer configured to store a plurality of addresses, wherein each one of said plurality of addresses identifies at least two consecutive cache lines of instructions, and wherein said plurality of addresses encompasses memory locations corresponding to a second plurality of instructions which are within said instruction processing pipeline;

a plurality of comparators coupled to said first bus and to said buffer such that each one of said plurality of comparators receives one of said plurality of addresses, wherein said plurality of comparators are configured to compare a subset of said first address to said plurality of addresses, and wherein said plurality of comparators are configured to assert signals indicating that the comparison indicates equality; and a control unit coupled to said buffer, and to said plurality of comparators, wherein said control unit is configured to store each one of said plurality of addresses into said buffer when at least one instruction encompassed by said one of said plurality of addresses is dispatched into said instruction processing pipeline.

2. The apparatus as recited in claim 1 wherein said buffer is configured to store a plurality of count values, wherein each one of said plurality of count values corresponds to a respective one of said plurality of addresses, and wherein said one of said plurality of count values is indicative of a number of said second plurality of instructions which are encompassed by said one of said plurality of addresses.

3. The apparatus as recited in claim 2 wherein said control unit is configured to increment a first one of said plurality of count values when additional instructions encompassed by a first one of said plurality of addresses are dispatched into said instruction processing pipeline.

4. The apparatus as recited in claim 3, wherein said control unit is coupled to receive a second indication upon a second bus, wherein said second indication identifies at least one of said second plurality of instructions, and wherein said one of said second plurality of instructions is being retired from said instruction processing pipeline, and wherein a second one of said plurality of addresses which encompasses memory locations corresponding to said one of said second plurality of instructions is identified by said second indication, and wherein said control unit is configured to decrement a second one of said plurality of count values corresponding to said second one of said plurality of addresses.

5. The apparatus as recited in claim 1 wherein said buffer comprises a first in, first out buffer, and wherein said plurality of addresses includes a second address, and wherein said second address is at a bottom of said first in, first out buffer.

6. The apparatus as recited in claim 5, wherein said control unit is configured to store a new address into said buffer if said second address does not encompass additional instructions dispatched into said instruction processing pipeline.

7. The apparatus as recited in claim 6 wherein said control unit is configured not to store said new address if said second address encompasses said additional instructions.

8. The apparatus as recited in claim 7 further comprising a third bus coupled to said control unit, wherein said third bus conveys a third indication that certain ones of said second plurality of instructions are being retired and that said certain ones of said second plurality of instructions include instructions encompassed by a pair of said plurality of addresses, and wherein said plurality of addresses includes a third address, and wherein said third address is at a top of said first in, first out buffer, and wherein said control unit is configured to delete said third address from said first in, first out buffer upon receipt of said third indication.

9. The apparatus as recited in claim 1 wherein said subset of said first address comprises a portion of said first address which identifies a page containing the memory location being updated.

10. The apparatus as recited in claim 1 wherein said control unit comprises a flush conductor, and wherein said control unit is configured to assert a flush signal upon said flush conductor in order to cause said microprocessor to discard said second plurality of instructions from said instruction processing pipeline, and wherein said control unit asserts said flush signal upon receipt of asserted signals from said plurality of comparators.

11. The apparatus as recited in claim 1 wherein said first address is indicative of an update by said microprocessor.

12. The apparatus as recited in claim 1 wherein said first address in indicative of an update by a second microprocessor coupled to said microprocessor.

* * * * *